March 15, 1949.  H. M. McCLURE  2,464,763
RULING PEN
Filed July 28, 1945
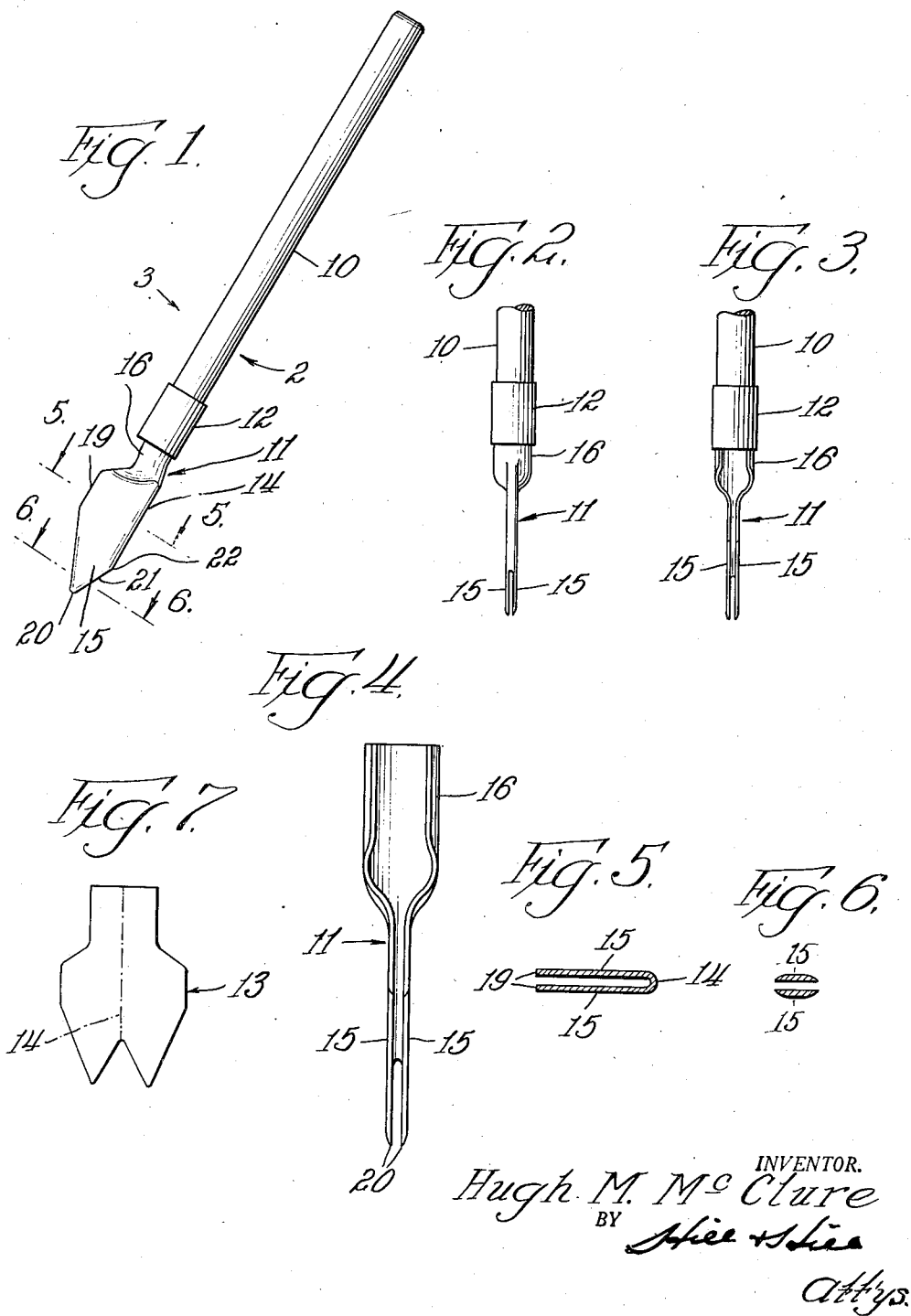
INVENTOR.
Hugh M. McClure
BY Hill & Lee
Attys.

Patented Mar. 15, 1949

2,464,763

UNITED STATES PATENT OFFICE 2,464,763

RULING PEN

Hugh M. McClure, Chicago, Ill., assignor to Keuffel & Esser Company, Hoboken, N. J., a corporation of New Jersey Application July 28, 1945, Serial No. 607,567

2 Claims. (Cl. 120—110)

This invention relates to ruling or lining instruments. The principal object of this invention is to provide at low cost a high quality precision ruling or lining instrument which will (1) guarantee the accuracy of the widths or "weights" of the lines designated to be drawn with it, (2) insure the uniformity of lines drawn with this instrument or with identified duplicates of it in any line width or "weight," (3) make possible the drawing of extraordinarily long lines without the necessity of either refilling the instrument with ink or other marking fluid, or making junctures in the line, (4) effect increased drafting production as a result of its greater ink or other marking fluid holding capacity and its precision manufacture in designated and instantly recognizable classifications to produce standardized line widths or "weights," and (5) accomplish the highly desirable result in drafting room production of guaranteeing the uniformity of the widths or "weights" of lines in the various classifications of lines, such as "light" lines, "full" lines, "heavy" lines, etc., throughout all of the drawings produced by the drafting room force.

My invention employs the well-known principle that opposing, keenly sharpened nibs or jaws separated from each other at a given distance will, in contact with the surface upon which a line is drawn with ink or other marking fluid, so confine the fluid between the sharpened nibs or jaws that a line is produced of exactly the same width or "weight" as is the distance of separation of the nibs or jaws. In my invention, this distance is accurately established in the precision manufacture of the instrument and is unchangeable. Even the re-sharpening of the nibs or jaws of my instrument by grinding or whetting cannot affect the distance by which they are separated for the reason that the inside surface planes of the nibs or jaws, which govern the line width or "weight" are exactly parallel, and these inside surface planes being inaccessible to grinding or whetting insure that the standard width or "weight" which the instrument was manufactured to produce, in any width or "weight" classification, will remain accurate and unchanged for the life of the instrument.

My ruling or lining instrument will retain at each filling, without danger of dripping, several times the quantity of ink or other marking fluid that can be retained by typical ruling instruments for accurate width line production. This is due to the long and wide parallel nibs or jaws which provide closely spaced relatively extended parallel surfaces and take advantage of the law of capillary attraction, making it possible for my instrument to retain such large quantities of liquid (ink).

With these and other objects and advantages in view, this invention consists in the several novel features hereinafter fully set forth and more particularly defined in the appended claims.

The invention is clearly illustrated in the accompanying drawing, in which:

Fig. 1 is a side elevation of a ruling or a lining instrument embodying a simple form of the present invention;

Fig. 2 is a view thereof looking in the direction of the arrow 2 in Fig. 1;

Fig. 3 is a view thereof looking in the direction of the arrow 3 in Fig. 1;

Fig. 4 is an edge elevation of the pen point alone;

Fig. 5 is a detail cross section taken on the line 5—5 of Fig. 1;

Fig. 6 is a detail cross section taken on the line 6—6 of Fig. 1; and

Fig. 7 is a plan of a blank from which the pen point is formed.

Figures 4 to 6 inclusive are upon an enlarged scale.

Referring to said drawing, the reference character 10 designates the holder of the instrument, which may comprise the conventional holder of the common and well known ruling or lining pen, and 11 designates a pen secured to the holder as by a ferrule or sleeve 12.

The pen is preferably made of high carbon, hardened and tempered sheet steel and comprises a single piece of metal formed up from a blank 13, as seen in Fig. 7, by folding the blank upon itself midway between its side edges, as at 14, along a line running longitudinally thereof to provide two closely spaced similar nibs or jaws 15 which extend parallel with each other throughout their extent. At one end of the nibs is a neck or shank portion 16, preferably of semi-circular form which merges into the nibs and is held between the holder 10 and the ferrule 12. The side edges 19 of the nibs are substantially parallel with the edge of the U-bend 14 and from said edges 19 the side edges 19 slope to the point 20 of the pen point. The U-bend terminates at 22 and from the end of the U-bend of the nibs the edges 21 slope to the point 20 on the same angle as the edges 19. The pointed ends of the nibs are sharpened, as by grinding or whetting, to provide a sharp point on each nib, although, if desired, the points may be rounded off a little.

The inner faces of the nibs are parallel throughout their extent and are spaced apart the same distances as the width of the lines to be drawn by the instrument. They always remain at this same distance and any sharpening of the points does not vary the distance between the points; consequently, the same width or "weight" of line is always drawn with the instrument. The drawing illustrates the nibs as spaced apart approximately one thirty-second of an inch and this is the maximum distance the nibs may be spaced apart to hold the ink or other drawing fluid by capillary attraction without certain additional features which form no part of this present application. However, the pen point may be made in various sizes with the spacing varied accordingly, whereby very fine lines may be drawn and with other instruments coarser lines may be drawn up to the maximum width of line that can be drawn with this instrument.

At the upper end of the nibs they merge into the neck or shank 16, said neck or shank being open on the side which is coincident with the edges 19 of the nibs, whereby ink or other marking fluid may be introduced to the space between the nibs through said opening. An ordinary small syringe may be used to fill the channel between the nibs. To clean the instrument, a piece of cardboard or the like may be slid in between the nibs, thereby ridding them of any ink or other marking fluid that may have adhered to the inner faces of the nibs.

From actual comparative tests made with typical ruling or lining instruments, my ruling or lining instrument will produce, with one filling, a continuous line of like width or "weight" from three to four times the length that can be drawn with typical ruling or lining pens with one filling.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A ruling or lining instrument for drawing lines of extended length and predetermined width comprising a pen having two similar nib members of extended surface area spaced in parallelism at an ink retaining distance from each other substantially throughout their entire area whereby said nib members cooperate to store the entire supply of ink and thereby form the entire ink retaining reservoir, means to hold said nibs in spaced parallel relation, each nib being tapered to a point, the tapered edges of the two nibs near the point being sharpened from the exposed surfaces of the nibs to a sharp edge at the parallel adjacent surfaces at least at said point.

2. A ruling or lining instrument for drawing lines of extended length and predetermined width comprising a pen having two similar nib members of extended surface area spaced in parallelism at an ink retaining distance from each other substantially throughout their entire area whereby said nib members cooperate to store the entire supply of ink and thereby form the entire ink retaining reservoir, means along one edge to hold said nibs in spaced parallel relation, each nib being tapered to a point, the tapered edges of the two nibs near the point being sharpened from the exposed surfaces of the nibs to a sharp edge at the parallel adjacent surfaces at least at said point.

HUGH M. McCLURE.

REFERENCES CITED

The following references are of record in the file of this patent:

UNITED STATES PATENTS

| Number | Name | Date |
|---|---|---|
| 818,258 | Kepner | Apr. 17, 1906 |
| 2,063,458 | Nome | Dec. 8, 1936 |
| 2,105,049 | Lungren | Jan. 11, 1938 |

FOREIGN PATENTS

| Number | Country | Date |
|---|---|---|
| 379,779 | France | 1907 |